United States Patent [19]

Gruver et al.

[11] Patent Number: 4,636,274
[45] Date of Patent: Jan. 13, 1987

[54] METHOD OF MAKING CIRCULATING ELECTROLYTE ELECTROCHEMICAL CELL HAVING GAS DEPOLARIZED CATHODE WITH HYDROPHOBIC BARRIER LAYER

[75] Inventors: Gary A. Gruver, South Windsor; Harold R. Kunz, Vernon, both of Conn.

[73] Assignee: United Technologies Corporation, Hartford, Conn.

[21] Appl. No.: 775,925

[22] Filed: Sep. 13, 1985

Related U.S. Application Data

[62] Division of Ser. No. 686,178, Dec. 24, 1984, Pat. No. 4,564,427.

[51] Int. Cl.$^4$ .................. B32B 27/06; C25B 11/06
[52] U.S. Cl. ................... 156/279; 156/324.4; 204/294; 264/105
[58] Field of Search .................. 204/294; 264/29.1-29.7, 105; 156/279, 324.4

[56] References Cited

U.S. PATENT DOCUMENTS

| 4,161,063 | 7/1979 | Goebel et al. | 264/105 |
| 4,193,860 | 3/1980 | Folser | 264/105 |
| 4,273,629 | 6/1981 | Korzch | 204/294 |
| 4,357,262 | 11/1982 | Solomon | 204/294 |
| 4,377,496 | 3/1983 | Solomon | 204/283 |
| 4,414,092 | 11/1983 | Lu et al. | 204/294 |
| 4,426,340 | 1/1984 | Goller et al. | 264/105 |
| 4,440,617 | 4/1984 | Solomon | 204/294 |
| 4,459,197 | 7/1984 | Solomon | 204/294 |
| 4,518,705 | 5/1985 | Solomon et al. | 204/294 |

Primary Examiner—John F. Niebling
Assistant Examiner—Terryence Chapman
Attorney, Agent, or Firm—A. Dean Olson

[57] ABSTRACT

Gas depolarized cathodes having hydrophobic barrier layers for circulation electrolyte electrochemical cells; methods of making said cathodes; and methods of electrolyzing solutions of halide containing compounds using said electrodes. Typically, in electrochemical cells cathodes are oriented vertically resulting in significant electrolyte pressure against the cathode. The barrier layer comprising fluorocarbon polymer and carbon results in substantially no electrolyte leakage through the cathode when the electrolyte pressure is up to three pounds per square inch above ambient.

1 Claim, 1 Drawing Figure

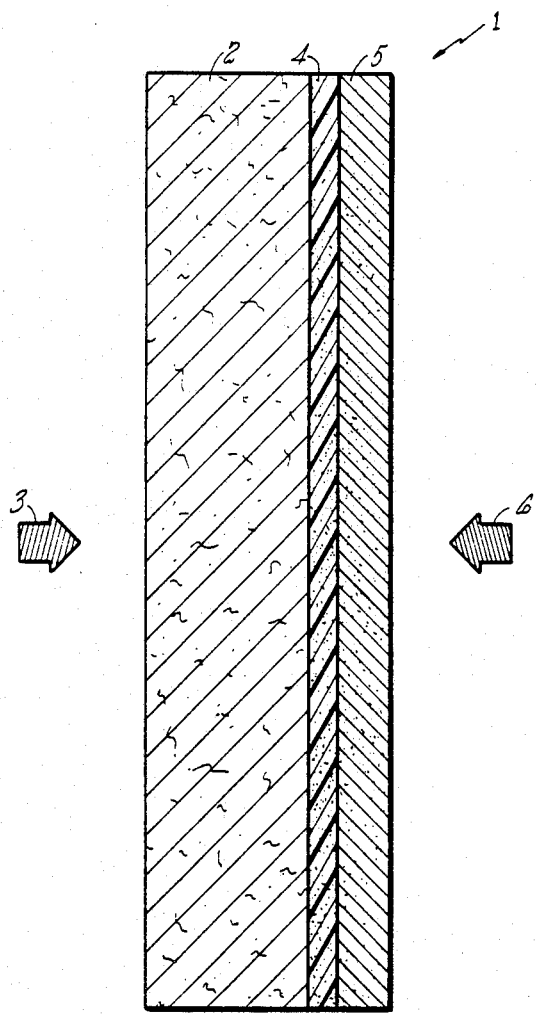

METHOD OF MAKING CIRCULATING ELECTROLYTE ELECTROCHEMICAL CELL HAVING GAS DEPOLARIZED CATHODE WITH HYDROPHOBIC BARRIER LAYER

This is a division of application Ser. No. 686,178 filed on Dec. 24, 1984, now U.S. Pat. No. 4,564,427.

TECHNICAL FIELD

The field of art to which this invention pertains is electrolytic cells of specific constructions and methods of making and using the same.

BACKGROUND ART

It is well known to electrolyze brine and other halides in electrochemical cells containing anode and cathode compartments separated by either an impervious ion selective membrane or a diaphragm. The power and consequently cost required for electrolysis of halides in these cells is, however, relatively high; one of the reasons being that the cathode reaction is the reduction of water to produce hydrogen gas. This reaction requires voltages of approximately 1.5 to 2.0 volts.

Research and development efforts have been directed at reducing the power levels for the electrolysis of brine by lowering the voltage required through the use of a different cathode reaction. For example, air cathodes (gas depolarized electrodes) that reduce oxygen to hydroxyl ions have been examined. Air cathodes require substantially lower voltages, around 0.5 volt, resulting in significantly reduced power requirements for the electrochemical cell; and although hydrogen gas is not produced in the air cathodes, the hydrogen gas produced by cathodes that electrolyze water is typically not used by industry.

These research and development efforts have not been totally successful. For instance, the cell performance although initially stable can drop dramatically during cell operation. Accordingly, there is a constant search in this art for electrolysis cells having gas depolarized electrodes that yield stable cell performance during operation.

DISCLOSURE OF INVENTION

This discovery is directed at circulating electrolyte electrochemical cells exhibiting stable performance. These cells contain electrolyte, an anode, a cathode of the gas depolarized type and means to separate the two. The gas depolarized cathode is comprised of a layer of fluorocarbon polymer that contains carbon particles that is bonded between a carbonized fiber porous substrate and a layer of an oxygen reducing catalyst. The cathode results in substantially no electrolyte leakage through the cathode when the electrolyte pressure is up to three pounds per square inch (psi) above ambient.

Another aspect of this disclosure is a method of making an electrolyte impervious gas depolarized cathode for use in a circulating electrolyte electrochemical cell. A carbonized fiber ribbed porous substrate is formed. A self-supporting barrier layer of a fluorocarbon polymer is press-molded and a layer of an oxygen reducing catalyst is applied to one side of the barrier layer. The uncoated side of the fluorocarbon barrier layer is bonded to the porous substrate. This forms a gas depolarized cathode that results in substantially no electrolyte leakage through the cathode when the electrolyte pressure is up to three psi above ambient.

Another aspect of this disclosure is a low energy method of electrolyzing solutions of halide containing compounds in stable circulating electrolyte electrochemical cells. These cells have electrolyte, an anode, a cathode such as described above, and means to separate those electrodes. The halides are electrolyzed by maintaining the electrolyte in contact with the electrodes, maintaining a supply of a reactive oxidant gas at the cathode, maintaining a supply of a reductant at the anode and applying a direct electric current to the cell. This causes reduction of the reactive oxidant gas at the gas depolarized cathode and oxidation of the reductant at the anode. The cathode results in substantially no electrolyte leakage through the cathode when the electrolyte pressure is up to three psi above ambient.

Other features and advantages will be apparent from the specification and claims and from the accompanying drawing which illustrates an embodiment of this invention.

BRIEF DESCRIPTION OF DRAWING

The FIGURE shows a typical gas depolarized cathode of the present invention.

BEST MODE FOR CARRYING OUT THE INVENTION

Any porous substrate compatible with the particular electrochemical application desired can be used with the present invention. The preferred substrate is a porous carbonized fiber substrate. The preferred shape is a ribbed substrate. It is especially preferred that the substrate is a resin bonded, wetproofed graphitized fibrous carbon paper having a high open porosity. The substrate is generally about 20 mils to about 50 mils in thickness. Substrate porosities range from as low as about 60% to as high as about 90% preferably about 80%. Typically, the porous substrate is wetproofed with from about 2 to about 10 milligrams per square centimeter of polytetrafluoroethylene (PTFE). However, as this invention incorporates a hydrophobic barrier in the electrode the PTFE wetproofing is optional. The substrate can be made as follows.

Carbon paper itself may be made, for example, by carbonizing a fiber such as nylon or rayon by heating at about 1300° F. The carbonized fibers are then cut to the desired length and made into paper by any one of the conventional paper making processes. The paper may then be graphitized by further heating. It may then be "wetproofed" by impregnating it with from 2–10 mg/cm$^2$ PTFE such as by dipping the graphitized carbon paper in a solution of TFE-30 ™ (DuPont de Nemours, E. I., Co.) containing 26% PTFE solids. TFE-30 is an aqueous dispersion (including a surfactant) of PTFE particles of about 0.2 micron size. The impregnated carbon paper is dried at 71°+6° C. for 25 minutes. It is then placed in a bath of isopropanol to leach out most of the surfactant. The leaching step is optional since the surfactant may be removed during later steps in the electrode manufacturing process. Finally, the substrate is heated to about 340° C. and held at the temperature for about 20 minutes. Methods for making carbon paper substrates are also described in commonly assigned U.S. Pat. No. 3,972,735, the disclosure of which is incorported by reference. Carbon fiber paper can also be purchased from various manufacturers such as Union Carbide Co. (New York, N.Y.), Stackpole Carbon Co. (St. Marys, Pa.), and Kreha Corp. of America (New York, N.Y.).

The hydrophobic barrier layer's characteristics are such that it should keep the electrolyte out of the electrode substrate so that the oxygen can flow through to the catalyst layer when the electrolyte pressure is up to three psi above ambient. Also, the barrier layer is such that a low resistance electrical continuity should be maintained between the cayalyst layer and the current collecting substrate.

Typically the hydrophobic barrier is composed of from about 50% to about 80% by weight PTFE with the remainder material being carbon. The layer should have a density of about 0.7 to about 1.2 grams per cubic centimeter ($g/cm^3$) of carbon, and a density of about 1.6 to about 2.2 $g/cm^3$ of PTFE. The electrode barrier layer has a thickness of about two mils to about five mils preferably about three mils. When the barrier layer is configured against a ribbed substrate, the thickness is about 8-10 mils. The layer has a porosity of about 60% to about 80%. It has a mean pore diameter size of about 0.2 micron ($\mu$) to about $0.4\mu$ preferably about $0.3\mu$. Preferably the barrier layer is self-supporting and somewhat stiff.

Generally any dry carbon including but not limited to acetylene black, carbon black, and graphite with a particle size about $0.02\mu$ to about $0.5\mu$ in diameter is suitable for forming the barrier layer for these electrodes. Alternatively carbon powder with large particle sizes may be used as long as they are first filtered through a one $\mu$ filter resulting in particle sizes less than one $\mu$ in diameter. The preferred carbon powder, Vulcan XC-72 TM (Cabot Corp., Boston, Mass.), has a particle size of about $0.02\mu$ to about $0.5\mu$ and a prime particle size of about $0.02\mu$. Prime particles are subparticles which form the particles (aggregates) described above. Conventional aqueous carbon slurries containing carbon particles whose sizes are less than about $0.2\mu$ are also suitable as a source of carbon.

Generally any hydrophobic polymer compatible with the system may be used in the substrate, barrier layer or catalyst layer. Typically, fluorocarbon polymers with molecular weights of $10^6$ or greater are suitable. Polytetrafluoroethylene is the preferred polymer but, fluorinated ethylene propylene (FEP) and other compatible hydrophobic fluorocarbon polymers and combinations thereof may also be suitable for such applications.

Generally any of the above polymer powders, typically in liquid dispersion form, with a particle size about $0.1\mu$ to about $0.3\mu$ in diameter may be used in the barrier layer. The especially preferred material Telfon 30 TM PTFE (DuPont de Nemours, E. I. Co.) has a particle size of about $0.15\mu$. As with the carbon powder, PTFE powder with a particle size larger than that described above may be utilized if it is filtered to a particle size less than $10\mu$ in diameter.

The barrier layer can be purchased as a carbon preform (such as the Stackpole MF-436 type carbon mat available from Stackpole Carbon Co.). The purchased layer is optionally wetproofed with PTFE and sintered at about 310° C. to about 340° C. for about 5 to 15 minutes preferably about 10 minutes. The barrier layer described above can also be made by combining carbon fibers and/or particles, and teflon particles such as are described above and press-molding them into a sheet at pressures of about 2 to about 50 psi and then heat-treating the sheet at temperatures of about 310° C. to about 340° C.

The catalyst layer generally comprises a carbon-hydrophobic polymer layer. Typically the carbon is precatalyzed, wherein an oxygen reducing catalyst, preferably a noble metal catalyst, is disposed on the surface of the carbon particles such that the carbon is a support for the catalyst. It is especially preferred that the catalyst is platinum. Catalyzed carbon may be made by conventional means including that described in commonly assigned U.S. Pat. No. 3,857,737 the disclosure which is incorporated by reference. Other catalysts can be used depending upon the application. For example, heat-treated macrocyclics such as iron tetramethoxyphenylporphyrin has been found suitable for use in chlorine production. The use of precatalyzed carbon is preferred because a separate catalyzing step after the carbon-hydrophobic polymer layer is applied to the substrate is thereby eliminated. The catalyst layer typically has a thickness of from about three mils to about six mils and a porosity of about 75% with a mean pore diameter size about $0.3\mu$.

Preferably the catalyst layer is applied by the dry method which is disclosed in commonly assigned U.S. Pat. Nos. 4,313,972 and 4,175,055, the disclosures of which are incorporated by reference. Thus carbon powder and an aqueous PTFE dispersion are blended into an alcohol/water solution to form a cosuspension of carbon and PTFE therein. The suspension is caused to floc, such as by heating or adding a floccing agent. Floccing is the coalescence of the catalyzed or uncatalyzed carbon particles with the PTFE particles. After floccing the excess liquid is decanted and the floc is dried and pulverized to fine powder. The powder is dispersed as a cloud of particles in a chamber over the barrier layer and pulled onto the barrier layer by drawing a vacuum under the barrier layer. The applied powder layer is then compacted at about 10 to 50 psi, preferably about 10 psi, and the coated barrier layer is sintered at about 340° to about 350° C., preferably about 350° C. for about 5 to 20 minutes, preferably about 10 minutes.

The barrier layer-catalyst layer is bonded to the substrate by placing against the substrate layer and press sintering. The preferred press sintering conditions are about 260°-340° C. temperature, preferably about 330° C., about 10 to 50 psi, preferably about 10 psi and about 2-10 minutes, preferably 5 minutes, sintering time. The especially preferred sintering conditions are about 330° C., about 10 psi, and about 5 minutes sintering time.

The cathodes of this invention can be made according to the above description and other methods conventional to the art. Briefly, as detailed above, the substrate is formed, the hydrophobic barrier layer is press-molded, the catalyst layer is applied to the hydrophobic barrier layer and the barrier-catalyst layer is bonded against the substrate. In an alternative method, the substrate is made, the hydrophobic barrier layer is applied to the substrate and the catalyst layer is applied to the hydrophobic barrier layer.

In the second method, the hydrophobic barrier is applied to the substrate by any suitable method including direct filtration, and indirect filtration (filter-transfer). Preferably the layer is applied by the dry method which is disclosed in the U.S. Pat. Nos. 4,313,972 and 4,175,055 cited above. Thus carbon powder and an aqueous PTFE dispersion are blended into an alcohol/water solution to form a co-suspension of carbon and PTFE therein. The suspension is caused to floc, such as by heating or adding a floccing agent. After floccing the excess liquid is decanted and the floc is dried and pulverized to fine powder. The powder is dispersed as a cloud of particles in a chamber over the substrate and pulled onto the substrate by drawing a vacuum under the substrate. The applied powder layer is then compacted at about 10 to about 50 psi and the coated substrate is sintered at about 320° C. to about 340° C. for about 10 to about 20 minutes.

The catalyst layer described above can then applied to the coated substrate by any suitable means, and preferably by a filter-transfer process. The dry method used for applying the hydrophobic barrier is generally not acceptable because the vacuum cannot effectively pull through the small pores of the hydrophobic barrier. In the filter transfer process carbon powder and an aqueous PTFE dispersion are blended into an alcohol/water solution to form a co-suspension of carbon and PTFE. The suspension is caused to floc, such as by heating or adding a floccing agent. After floccing, the excess liquid is decanted and the floc is filtered onto special filter paper. Liquids pass through the filter and a layer of the desired solids mixture (i.e. the floc) remains on the surface of the filter paper. The layer is then transferred from the filter paper onto the coated substrate, dried, compacted, and sintered.

Preferably the first method detailed above is used to construct the cathode although the barrier layer need not be constructed as a self-supporting construct, which is bonded to the substrate. The barrier layer composition can be applied to the substrate utilizing conventional methods, i.e., filter transfer means. However, for larger scale operation the preform barrier layer is simpler to manufacture. In addition, for instance, when forming the bilayer from suspension directly onto a large pore ribbed substrate, there would be a transition region where the desired properties of neither the barrier layer nor the substrate would be effective. Some of the fine pores of the barrier layer would be imbedded into the substrate, which would hinder oxygen diffusion through the final portion of the substrate; conversely, the more wettable and larger pore structure of the substrate would channel electrolyte into part of the barrier layer in this interface region, creating possible leak sites. The discrete elements disclosed herein would eliminate most of the transition region and minimize these effects. Also direct filtering of the bilayer onto the ribbed substrate may be done on small test electrodes, but this would be very difficult to do on full sized electrodes.

Conventional circulating electrolyte electrochemical cells containing electrodes of the present invention are useful when the cells' orientation is such that the electrolyte pressure is up to about three psi above ambient. This type of electrode for example is utilized as a gas depolarizing cathode in a typical cell used for the production of peroxydisulfuric acid or the electrolysis of halides preferably chlorine. These electrochemical cells have conventional anodes appropriate to the process. For example the dimensionally stabilized anode (DSA) is used for chlorine production. Any conventional electrolyte system suitable for these applications, such as sodium chlorided brine may be utilized. Typically, a means is utilized to separate the anode from the cathode. The means is selected such that only the electrolyte solution can diffuse through it. Examples include a porous asbestos diaphragm, perfluorinated sulfonic acid membranes, and perfluorinated carboxylic acid membranes.

In this aspect of the invention a conventional electrolysis process is carried out. Electrolyte is maintained in contact with the electrodes to complete the electrical circuit. A supply of a reactive oxidant gas preferably air is maintained at the cathode by conventional means such as a fan or blower. A supply of a reductant preferably an aqueous halide solution such as brine is maintained at the anode by conventional means such as a liquid pump. A reductant by definition is that species that is oxidized at the anode and is typically contained in the electrolyte system. A direct electric current of about 50 milliamperes per square centimeter ($ma/cm^2$) to about 500 $ma/cm^2$ is passed through the cell (across the electrodes) and causes the reduction of the oxidant gas at the cathode and the oxidation of the reductant at the anode. An example of such an electrolysis process is a chlor-alkali process. At the cathode air is reduced to hydroxyl ions. At the anode, brine is oxidized to chlorine. The reactions can be written as follows:

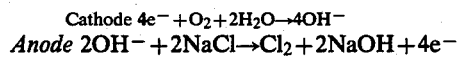

Cathode $4e^- + O_2 + 2H_2O \rightarrow 4OH^-$
Anode $2OH^- + 2NaCl \rightarrow Cl_2 + 2NaOH + 4e^-$ The use of this cathode, according to the present invention, results in substantially no electrolyte leakage through the cathode when the electrolyte pressure is high, preferably when the electrolyte pressure is up to three psi above ambient. However, since even at pressures of about 0.002 psi, electrolyte leakage can occur, these electrodes are useful over a wide range of electrolyte pressure. A clearer understanding of this can be had by reference to the FIGURE.

In the figure of a gas depolarizing cathode (1) gas is in contact along the whole border of the substrate (2) and flows in the direction of arrow (3) through the porous substrate (2), the hydrophobic barrier layer (4), and into the catalyst layer (5) where it reacts catalytically with electrolyte present in that layer. Electrolyte is in contact along the whole border of the catalyst layer (5) and flows in the direction of arrow (6) into the catalyst layer (5) but is prevented by the hydrophobic barrier layer (4) from leaking into the substrate layer (2). Electrolyte in the substrate layer (2) inhibits the diffusion of gas through the substrate layer (2) to the catalyst layer (5).

EXAMPLE A carbon fiber mat substrate available from Union Carbide Co. was wetproofed with FEP Teflon ™ (Dupont de Nemours, E. I., Co.). A non-wetting hydrophobic barrier layer containing 50% Vulcan XC-72 at a 5 milligram per square centimeter loading (weight of material per electrode frontal area) and 50% Teflon 30 was applied by a direct filter technique. The substrate and layer were sintered for 15 minutes at 350° C. Then a catalyst layer containing catalyzed carbon (10% plantinum on Vulcan XC-72) at a loading of 0.50 milligrams Pt per square centimeter with a Teflon 30 content of 40% was applied by a filter-transfer process to the hydrophobic layer. This tri-layer electrode was then sintered for 15 minutes at 340° C. The cathode described above was tested with a Nafion ™ (Dupont de Nemours E. I., Co., Wilmington, Del.) membrane in a circulating sodium hydroxide cell. The cathode did not leak.

Although this disclosure has been directed at cathodes, it would be known to one skilled in the art that gas depolarized anodes could be similarly constructed with appropriate modification of materials and processes and used to advantage in applications such as metal electrowinning.

These cathodes advance electrochemical technology by facilitating the use of gas depolarizing cathodes in the electrolysis industries. Typically cathodes are oriented vertically resulting in high levels of electrolyte pressure. The electrolyte pressure results in electrolyte leakage into the porous substrate which inhibits the gas from diffusing through that same substrate to the catalyst layer. The cathode of this invention, with its hydrophobic barrier layer, prevents electrolyte leakage at elevated levels of electrolyte head providing electrochemical cells having significantly improved stability.

The increased stability of these air cathodes enables their utilization as replacements for high power consuming electrodes. For instance, typical cathodes that reduce water to produce hydrogen gas requires voltages of approximately 1.5 to 2.0 volt. When replaced with an air cathode that reduces oxygen to hydroxyl ions the voltage required drops to around 0.5 volt resulting in significantly reduced power requirements for the electrochemical cell. Thus, these electrodes provide significantly increased stability for circulating electrolyte cells that contain gas depolarized electrodes resulting in energy savings.

It should be understood that the invention is not limited to the particular embodiments shown and described herein, but that various changes and modifications may be made without departing from the spirit and scope of this novel concept as defined by the following claims.

We claim:

1. A method of making a gas depolarized cathode particularly adapted for use in a circulating electrolyte electrochemical cell comprising:
   (a) forming a carbonized fiber ribbed porous substrate;
   (b) press-molding a self-supporting layer of a fluorocarbon polymer that contains carbon particles;
   (c) applying a layer of an oxygen reducing catalyst on one side of the fluorocarbon polymer layer; and
   (d) bonding the uncoated side of the fluorocarbon polymer layer to the porous substrate;

resulting in substantially no electrolyte leakage through the cathode when the electrolyte pressure is up to three pounds per square inch above ambient.

* * * * *